(12) United States Patent
Allison et al.

(10) Patent No.: US 7,761,669 B2
(45) Date of Patent: *Jul. 20, 2010

(54) MEMORY CONTROLLER GRANULAR READ QUEUE DYNAMIC OPTIMIZATION OF COMMAND SELECTION

(75) Inventors: Brian David Allison, Rochester, MN (US); Wayne Barrett, Rochester, MN (US); Joseph Allen Kirscht, Rochester, MN (US); Elizabeth A. McGlone, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 382 days.

This patent is subject to a terminal disclaimer.

(21) Appl. No.: 11/775,459

(22) Filed: Jul. 10, 2007

(65) Prior Publication Data
US 2009/0019239 A1 Jan. 15, 2009

(51) Int. Cl.
*G06F 12/00* (2006.01)
*G06F 13/18* (2006.01)
(52) U.S. Cl. .............................. 711/151; 711/105; 710/6
(58) Field of Classification Search ................. 711/105, 711/106, 151; 710/5, 6
See application file for complete search history.

(56) References Cited

U.S. PATENT DOCUMENTS

| 5,761,475 | A * | 6/1998 | Yung et al. .................. 712/218 |
| 5,784,582 | A | 7/1998 | Hughes |
| 6,799,257 | B2 | 9/2004 | Sprangle et al. |
| 7,296,112 | B1 * | 11/2007 | Yarlagadda et al. ......... 711/105 |
| 2003/0084274 | A1 | 5/2003 | Gaither et al. |
| 2003/0182490 | A1 | 9/2003 | Kurupati |
| 2003/0217224 | A1 | 11/2003 | Watts |
| 2004/0103258 | A1 * | 5/2004 | Blackmon et al. ........... 711/167 |
| 2004/0177184 | A1 * | 9/2004 | Steinman et al. ............ 710/100 |
| 2005/0091460 | A1 | 4/2005 | Rotithor et al. |
| 2006/0026342 | A1 * | 2/2006 | Calvignac et al. ........... 711/105 |
| 2007/0150688 | A1 * | 6/2007 | Osborne et al. ............. 711/168 |

* cited by examiner

*Primary Examiner*—Shane M Thomas
(74) *Attorney, Agent, or Firm*—Robert R. Williams (57) ABSTRACT

A memory controller receives read requests from a processor into a read queue. The memory controller dynamically modifies an order of servicing the requests based on how many pending requests are in the read queue. When the read queue is relatively empty, requests are serviced oldest first to minimize latency. When the read queue becomes progressively fuller, requests are progressively, using three or more memory access modes, serviced in a manner that increases throughput on a memory bus to reduce the likelihood that the read queue will become full and further requests from the processor would have to be halted.

7 Claims, 8 Drawing Sheets

MEMORY CONTROLLER GRANULAR READ QUEUE DYNAMIC OPTIMIZATION OF COMMAND SELECTION

CROSS-REFERENCE TO RELATED APPLICATIONS

This application is related to U.S. application Ser. No. 11/775,411, filed on Jul. 10, 2007, entitled Memory Controller Read Queue Dynamic Optimization of Command Selection.

BACKGROUND OF THE INVENTION

1. Field of the Invention

This invention relates generally to memory controllers in computer systems. More particularly this invention relates to controlling an order in which memory fetches are made.

2. Description of the Related Art

Modern computer systems comprise one or more processors that need rapid access to data stored in a memory in order to achieve high throughput from the one or more processors. The computer systems typically have a memory controller between the processors and the memory. Requests are sent on a processor bus and are queued up in a read queue in the memory controller. The memory controller schedules read accesses to the memory, queues up data read from the memory, and transmits the data for transmission to the processors.

If the read queue becomes full, no further requests can be accepted by the memory controller. This situation degrades throughput and is therefore undesirable.

Therefore, there is a need for a method and apparatus for reducing or eliminating occurrences when the read queue becomes full.

SUMMARY OF THE INVENTION

The present invention provides methods and apparatus for improving memory accessing in a computer system by reducing likelihood or avoiding an undesirable condition in a memory controller where a read queue becomes full. Embodiments of the invention are particularly advantageous in a computer system that requires data to be returned from memory in a same order that the data was requested. Embodiments of the invention are also particularly advantageous in a computer system that closes banks in memory chips after reading data from the memory chips rather than keeping the banks open.

In an embodiment, a processor issues requests for data from a memory. The memory comprises a first memory chip and a second memory chip, each memory chip having a plurality of banks. Consecutive reads from the first memory chip do not require dead cycles on a memory bus. Consecutive reads from the second memory chip do not require dead cycles on the memory bus. A first read from the first memory chip followed by a second read from a second memory chip does require a dead cycle on the memory bus. Lowest latency for requests occurs when requests are serviced in the order issued by the processor and is preferred until the read queue fills to a first threshold of requests. As the read queue becomes progressively fuller, on a granular basis, sequences of reads to the first memory chip or to the second memory chip are identified and serviced out of order to reduce or eliminate dead cycles on the memory bus.

In a method embodiment, a method is described, including a first step of receiving read requests issued by a processor into a read queue, and determining a memory access mode, from a set of more than two memory modes, based on a number of pending requests in the read queue.

DETAILED DESCRIPTION OF THE PREFERRED EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In a computer system with a processor(s) operating in In-Order mode (that is, data being returned to the processor in the same order requested), it is very advantageous for a memory controller to prioritize oldest read requests over younger read requests, selecting a younger read request only if the younger read request does not impact a read latency of the oldest read request. If data is fetched from memory chips out of order, a processor bus must wait for the oldest data to be fetched from memory, thereby stalling the processor bus. However, this scheme does not result in an optimized memory bus throughput, and because memory bus throughput is not optimized a read queue may become full, preventing the computer system from issuing more requests. Optimizing throughput on the memory bus is also advantageous even for processors configured to receive data from the memory controller out of order.

The present invention provides method and apparatus embodiments to reduce or eliminate occurrences of a read queue in a memory controller becoming full in a computer system.

In an embodiment, more than two memory access modes of accessing memory on a memory bus are implemented. A first memory access mode provides a minimum time interval from when the memory controller receives a read request to when the data is sent to the requesting processor. A second memory access mode increases throughput on a memory bus by servicing one or more younger requests before servicing an older request if doing so eliminates one or more dead cycles on the memory bus. A third memory access mode is a high bandwidth mode maximizes data throughput on the memory bus by increasing throughput on the memory bus more than does the second memory access mode by allowing the oldest request to be further delayed in favor of servicing more younger requests before the oldest request than is done in the second memory access mode, if servicing the younger requests before the oldest request eliminates dead cycles on the memory bus.

Figure 1:
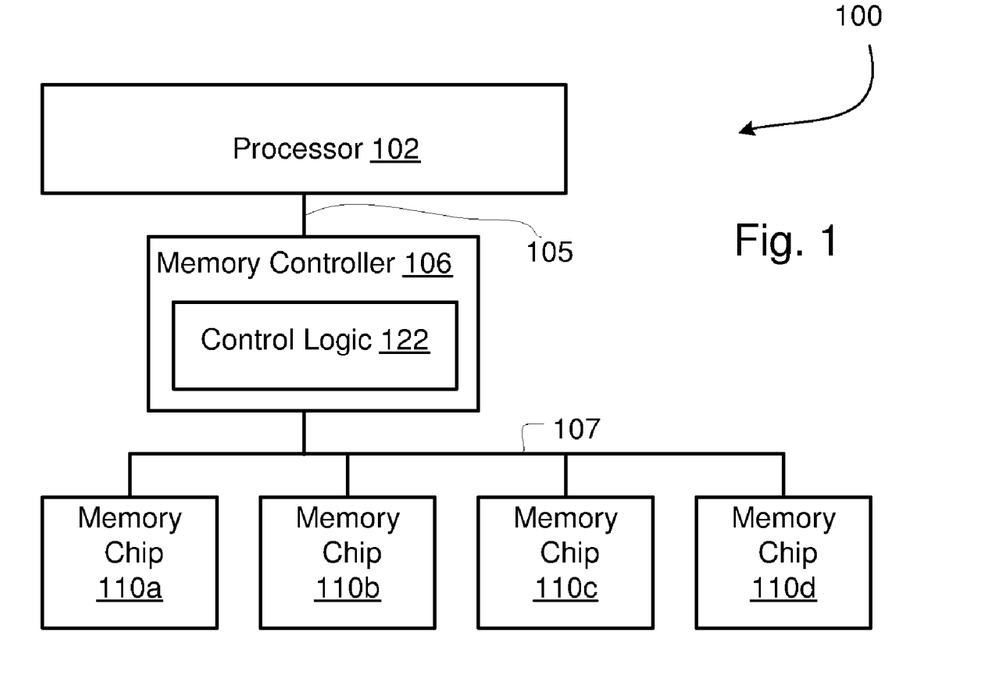
FIG. 1 shows a block diagram of a computer system.

With reference now to FIG. 1, computer system 100 is shown in block diagram form. For ease of understanding, only elements of computer system 100 necessary for understanding embodiments of the invention are shown. It is understood that computer systems further comprise many other elements (e.g., disks, network communication facilities, and so on).

Computer system 100 includes a processor 102 configured to issue requests for data from memory.

Processor 102 is coupled to a memory controller 106 with a processor bus 105. Many embodiments of processor busses are known, such as bidirectional busses, unidirectional busses, busses in which address/control portions are time multiplexed with data, busses having separate address/control portions, and the like. It is also understood that in various implementations, memory controller 106 and processor bus 105 are physically placed on the same semiconductor chip as processor 102.

Memory controller 106 is coupled to a plurality of memory chips 110 (shown as instances 110a-110d in FIG. 1) with memory bus 107. Memory controller 106 further comprises control logic 122 which will be described later. It is understood that some implementations of computer systems insert buffer chips between memory controller 106 and memory chips 110. Memory controller 106 will be described in more detail later.

Figure 2:
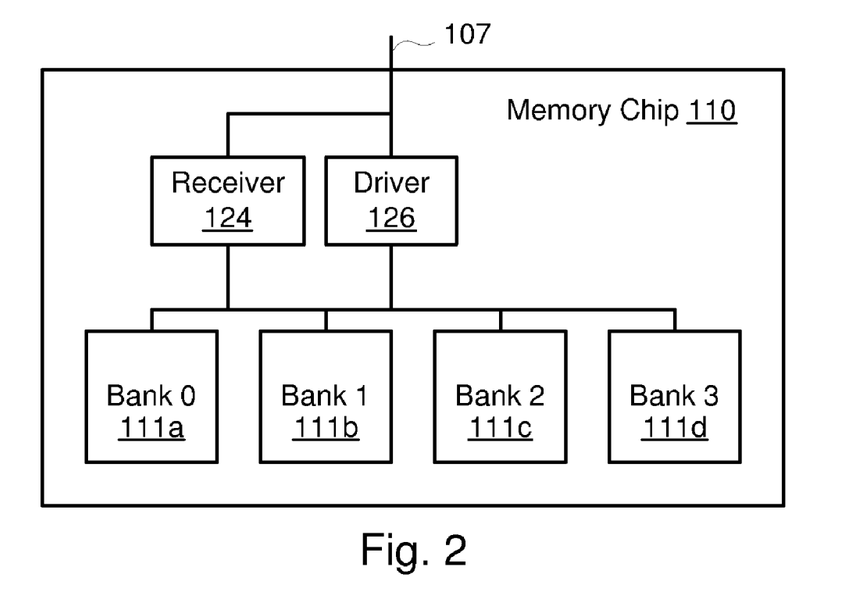
FIG. 2 shows a block diagram of a memory chip used by the computer system of FIG. 1.

FIG. 2 shows a block diagram of a memory chip 110. A driver 126 is configured to drive data read from memory chip 110 onto memory bus 107. It is understood that memory chip 110 further comprises a receiver 124 configured to receive data and/or address/commands from memory bus 107. Memory chip 110 further comprises a plurality of banks 111 (instances referenced as 111a, 111b, 111c, and 111d), shown as bank 0 through bank 3. Although four banks 111 are shown, more or fewer banks 111 are contemplated.

Figure 3:
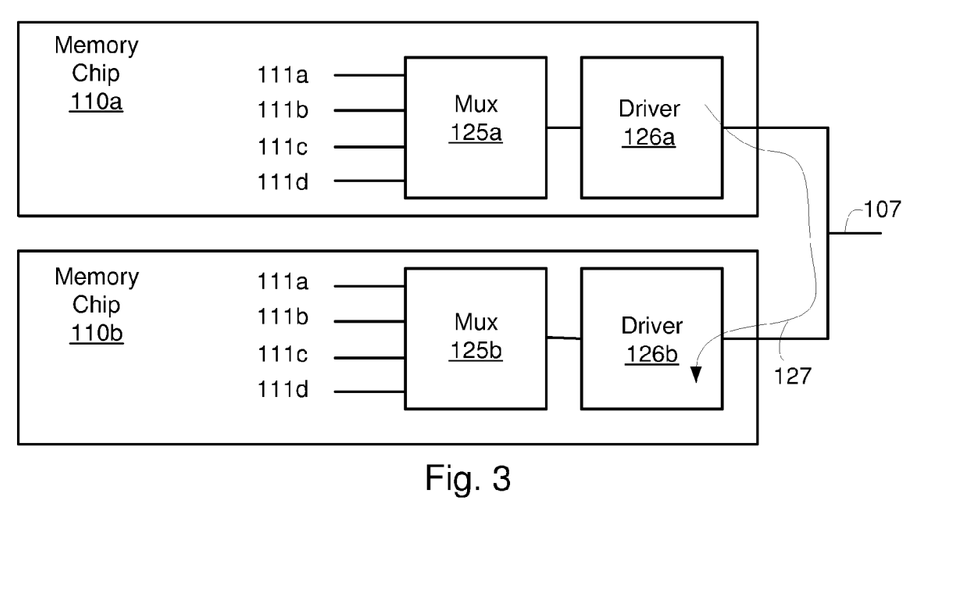
FIG. 3 illustrates a problem that can arise if consecutive accesses from a first memory chip and a second memory chip occur without a gap ("dead cycle") on a memory bus.

FIG. 3 shows two memory chips 110 (110a and 110b) connected to memory bus 107. Memory chip 110a includes banks 0-3 111a-111d, multiplexer 125a, and driver 126a. Memory chip 110b includes banks 0-3 111a-111d, multiplexer 125b, and driver 126b. If driver 126a drives a "1" (e.g., a high voltage) on memory bus 107 on a first cycle, and driver 126b drives a "0" (e.g., a low voltage) on memory bus 107 on an immediately following second cycle, some shoot-through current 127 will occur due to switching transition times in drivers 126a and 126b not being instantaneous, and/or normal timing skews between memory chips 110a and 110b. Shoot-through current 127 is current that goes through both driver 126a and 126b in the figure. Such timing skews may result from process variations, differences in wiring lengths on printed wiring cards upon which memory chips 110a and 110b are attached, and so on. Shoot-through current 127 is undesirable. First, shoot-through current 127 increases power consumption of memory chips 110a and 110b. Second, shoot-through current 127 may cause undesirable voltage drops in the voltage supplies used by memory chips 110a and 110b. Third, shoot-through current 127 means that, for a brief time, drivers 126a and 126b are both partially on (conducting), resulting in an indeterminate, unreliable, logic level being driven onto memory bus 107. For these reasons, a gap, or "dead cycle" is required to be placed between a first cycle in which driver 126a drives memory bus 107 and a second cycle in which driver 126b drives memory bus 107.

Figure 4:
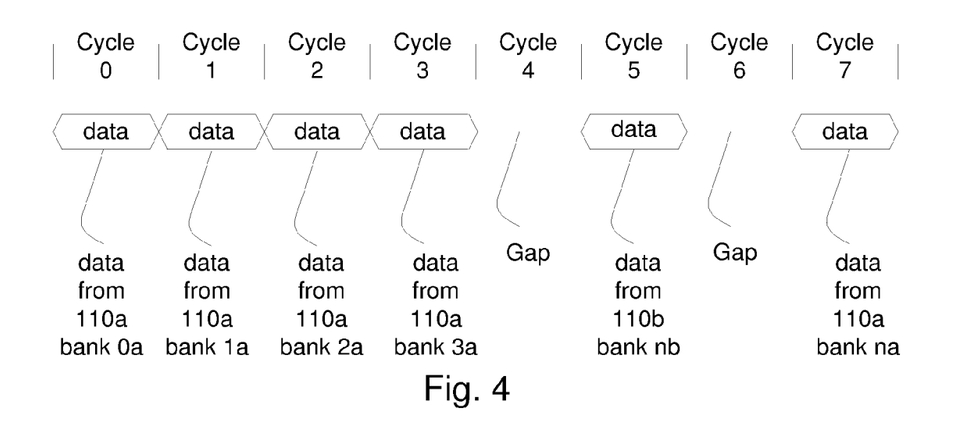
FIG. 4 shows a number of accesses from different banks of a first memory chip followed by an access to a second memory chip with a required gap on the memory bus.

FIG. 4 further illustrates allowed driving of memory bus 107. Four consecutive data reads are made from memory chip 110a, a first read from bank 0a during cycle 0, a second read from bank 1a on cycle 1, a third read from bank 2a on cycle 2, and a fourth read from bank 3a on cycle 3. Following the read from bank 3a on cycle 3, a gap, or "dead cycle" is required on cycle 4 to avoid the shoot-through current 127 described with reference to FIG. 3. On cycle 5, data is read from memory chip 110b (any bank). Since the next read is again from memory chip 110a, another gap is required on cycle 6, followed by the read from a memory bank on memory chip 110a on cycle 7. It will be understood from the above explanation that transmission of data from memory chips 110 is maximized when consecutive reads are made from the same memory chip 110 to the degree possible before reading data from a different memory chip 110.

Modern memory chips may have further restrictions on a number of consecutive reads from a particular memory chip, for example, a particular memory chip product may be limited to four consecutive reads. A particular bank can not be consecutively read because time is required to close the particular bank before the bank can again be read. For example, in the case of DRAM (dynamic random access memory), data read from a bank must be rewritten into storage cells and bit lines must be driven to a predefined voltage. It is understood that, in many memory chips, many consecutive reads to the same bank can be performed if the bank is kept open. Embodiments of the present invention are directed to use of memory chips where servicing a read request opens a bank, reads data from the bank, and closes the bank.

Many modern memory chips 110 transmit multiple beats of data onto memory bus 107 responsive to a read. For example, a read from a particular memory bank may provide sixteen bits of data, but a particular memory chip 110 may physically have eight drivers 126 (see driver 126 in FIG. 3). In such an implementation, two beats of data are driven onto memory bus 107 responsive to a read (That is, the eight drivers drive a first group of eight bits onto memory bus 107 on a first beat, and the eight drivers drive a second group of eight bits onto memory bus 107 on a second beat). Referring again to FIG. 4, in such an implementation each of the cycles in which data is driven (i.e., cycles 0, 1, 2, 3, 5, and 7) comprise two bus driving cycles on memory bus 107. Cycles 4 and 6 are "gaps" or "dead cycles". Depending on specifications of particular memory chips 110, cycles 4 and 6 may be one bus driving cycle or two bus driving cycles in duration.

Figure 5:
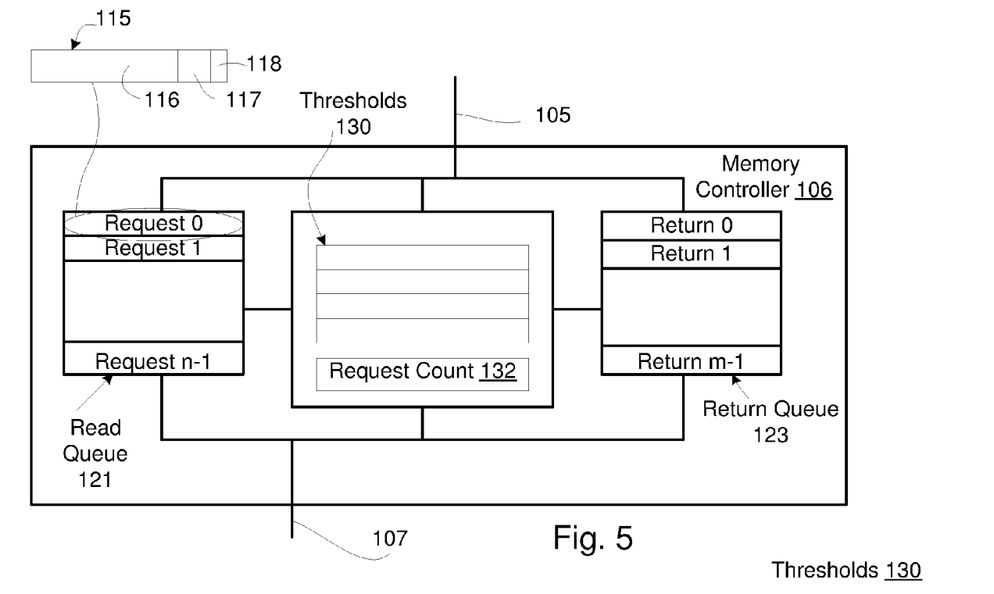
FIG. 5 is a block diagram of a memory controller.

FIG. 5 shows memory controller 106 in more detail. Memory controller 106 includes a read queue 121 that buffers requests 115 from processor 102. Read queue 121 is shown to have capacity to buffer "n" requests 115 (i.e., request 0 through request n−1). Each request 115 in read queue 121 may include an address field 116, ordering information field 117 that keeps track of the order that requests 115 were received and a speculative request field 118 that indicates that a particular request is speculative and which may or may not actually be needed by processor 102. Processor 102, in embodiments, is configured to make a speculative request if processor 102 predicts that data in the speculative request may be needed. Address field 116 in an embodiment contains information as to which memory chip 110 and which bank 111 is addressed by the request. In another embodiment, control logic 122 is configured to determine which memory chip 110 and which bank 111 is to be read from based upon address field 116. In an embodiment, read queue 121 implicitly maintains order that requests were received by position in read queue 121 instead of having an ordering information field 117.

Memory controller 106 includes control logic 122. Control logic 122 controls which requests 115 in read queue 121 are driven on memory bus 107 at particular times. Control logic 122 contains a request count 132 that indicates how many pending requests are in read queue 121. For example, if there are no pending requests in read queue 121, request count 132 would have a value of zero. If read queue 121 is completely full, and can accept no more requests from processor 102, request count 132 has a value of "n" (in the example of FIG. 5. Note that request count 132 must have a maximum value of "n", rather than "n−1" to account for the case where there are zero pending requests). Control logic 122 contains thresholds 130 which further include a plurality of threshold values that are compared against a current value of request count 132, the comparison of one or more threshold values against the current value of request count 132 used to control an order of servicing of the requests to memory chips 110.

In a first embodiment, thresholds 130 are programmable. For example, thresholds 130 may contain a number of registers, each register configured to have a threshold value written or scanned into the each register. Programmable also includes programming by fuses or antifuses either when a chip containing the memory controller 106 is manufactured or electrically programmed at a later time. In a second embodiment, thresholds 130 may be simply "hard wired" into memory controller 106.

Memory controller 106 also may contain a return queue 123. Return queue 123 buffers data that will be sent on processor bus 105 to processor 102 in the order requested by the processor 102, in an embodiment of processor 102 that requires data to be returned in the same order the data was requested. That is, if control logic 122 services requests (makes reads to memory chips 110) out of order (with respect to the order sent by processor 102) control logic 122 manages return queue 123 in a conventional manner to buffer data and transmit data back to processor 102 in the order requested.

It is understood that processor 102 also makes write requests to memory controller 106. Memory controller 106 also has a write queue (not shown). Modern computer systems have memory controllers 106 that prioritize reads over writes, in order that processor 102 quickly gets data requested, and write requests are satisfied when there are no read requests, when read requests are for speculative reads, or, in some embodiments, when the write queue is nearly full. Embodiments of the present invention deal with read requests, and therefore discussion of write requests, write queue, and servicing of write requests will not be described herein.

Figure 6A:
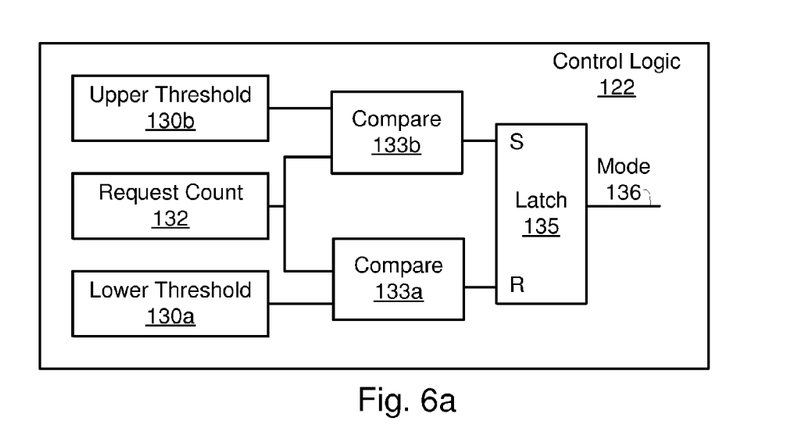
FIG. 6a is a block diagram of a memory access mode creation function embodiment in a memory controller.

FIG. 6a shows a first embodiment of a portion of control logic 122. The embodiment shown in FIG. 6a comprises request count 132 as described above and two thresholds, 130a and 130b. A first compare 133a compares request count 132 with "lower threshold" 130a. A second compare 133b compares request count 132 with "upper threshold" 130b. Compare 133a is coupled to a reset input of a latch 135. Compare 133b is coupled to a set input of latch 135. When computer system 100 is initialized, request count 132 is initialized to zero (that is, no pending requests). As processor 102 sends requests over processor bus 105, read queue 121 begins to queue up requests; request count 132 is incremented as requests enter read queue 121 and is decremented as requests from read queue 121 are serviced. Control logic 122, in the embodiment of FIG. 6a, begins in a low latency mode that is the memory access mode when latch 135 is reset. In the low latency mode, control logic 122 services requests in such a way as to minimize latency; that is, oldest requests are handled first, unless a younger request can be serviced without impacting latency of the oldest request. If the oldest request is waiting on a prior request to a particular bank on a particular memory chip 110, it may be possible to service a younger request without impacting latency of the oldest request.

Servicing requests to minimize latency, however, often requires making reads to different memory chips 110, which results in a number of gaps (dead cycles) on memory bus 107 and therefore reducing data throughput on memory bus 107. Memory controller 106 may begin to fall behind, that is, not servicing requests as fast as processor 102 sends requests. When this happens, read queue 121 begins to fill up. When read queue 121 is full, no further requests can be accepted and processor 102 is unable to transmit any more requests until read queue 121 again has room for more requests.

Accelerating throughput by eliminating gaps on memory bus 107, at the expense of minimizing latency, can reduce or eliminate a condition of a full read queue 121. When a value in request count 132 exceeds a value of threshold 130b (an "upper threshold"), compare 133b sets latch 135 to "1", changing memory access mode 136 to "1", a high bandwidth mode. Responsive to memory access mode 136 being "1", control logic 122 services requests 115 in a manner that minimizes gaps on memory bus 107. Control logic 122 does this by selecting and servicing requests that make consecutive accesses to different banks on a single memory chip 110 to the extent possible, thereby eliminating gaps on memory bus 107. To illustrate this by further example, Table 1 shows sixteen requests in a read queue, numbered 00 through 15, with request 0 being the oldest request and request 15 being the youngest request.

TABLE 1

| Request # | Memory Chip # | Memory Internal Bank |
| --- | --- | --- |
| 15 | 0 | 3 |
| 14 | 0 | 2 |
| 13 | 0 | 1 |
| 12 | 1 | 3 |
| 11 | 1 | 2 |
| 10 | 1 | 1 |
| 09 | 2 | 3 |
| 08 | 2 | 2 |
| 07 | 2 | 1 |
| 06 | 3 | 3 |
| 05 | 3 | 2 |
| 04 | 3 | 1 |
| 03 | 3 | 0 |
| 02 | 2 | 0 |
| 01 | 1 | 0 |
| 00 | 0 | 0 |

Memory controller 122, in the "high bandwidth" mode that maximizes throughput on memory bus 107, accesses the requests as follows, giving, for each cycle on memory bus 107, the read queue request number from table 1, and "-" for gaps (dead cycles) on memory bus 107. Four memory chips 110 are assumed (0-3), each memory chip 110 having four banks 111 (0-3). Only nineteen cycles, including three gaps, on memory bus 107 are required.

00 13 14 15-01 10 11 12-02 07 08 09-03 04 05 06

The memory chip number and the bank number of the above request services are given below, with the numbers per cycle indicating memory chip and bank on the selected memory chip. For example, "00" means memory chip 0, bank 0; "23" means memory chip 2, bank 3.

00 01 02 03-10 11 12 13-20 21 22 23-30 31 32 33

Again using the read queue state of Table 1, memory controller 106, in a "low latency" mode (where requests are serviced "oldest request first", unless a younger request can be serviced without impacting latency of the oldest request), the following shows request number services on memory bus 107.

00-01-02-03 04 05 06-07 08 09-10 11 12-13 14 15

Twenty two cycles on memory bus 107 are required. Six gaps on memory bus 107 are required in this "low latency" mode, wasting some potential bandwidth on memory bus 107, but ensuring minimum latencies on requests.

The following shows the chip number and bank number for each cycle on memory bus 107 for the case of the "low latency" mode.

00-10-20-30 31 32 33-21 22 23-11 12 13-01 02 03

It is clear from the above examples that making consecutive reads to different memory chips 110 significantly impacts throughput on memory bus 107, and the ability to reorder request servicing to read from different banks 111 on the same memory chip 110 improves throughput on memory bus 107.

Figure 6B:
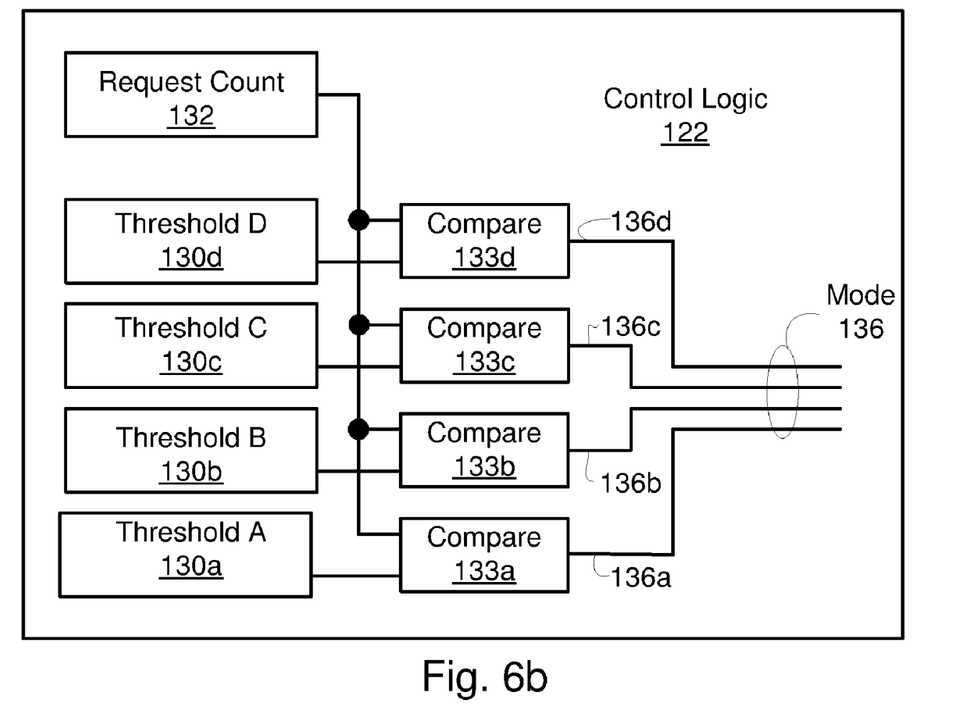
FIG. 6b is a block diagram of a second memory access mode creation function embodiment in a memory controller.

FIG. 6b shows a second embodiment of control logic 122 that provides granularity in how requests are serviced depending on how full read queue 121 is becoming. Control logic 122 in FIG. 6b includes request count 132, which indicates how many pending requests are in read queue 121. Four thresholds 130 are shown in FIG. 6b, "Threshold A" 130a; "Threshold B" 130b; "Threshold C", 130c; and "Threshold D" 130d. The value currently in request count 132 is compared with each of the thresholds 130 using compares 133a, 133b, 133c, and 133d. For example, assuming a read queue 121 capable of storing sixteen requests, assume that threshold A 130a is set to eight; threshold B 130b is set to ten; threshold C 130c is set to twelve; and threshold D 130d is set to fourteen. When read queue 121 is fairly empty (less than eight requests), a "low latency" mode as described above is implemented; that is, an oldest request is serviced first unless a younger request can be serviced without impacting latency of the oldest request.

Figure 13:
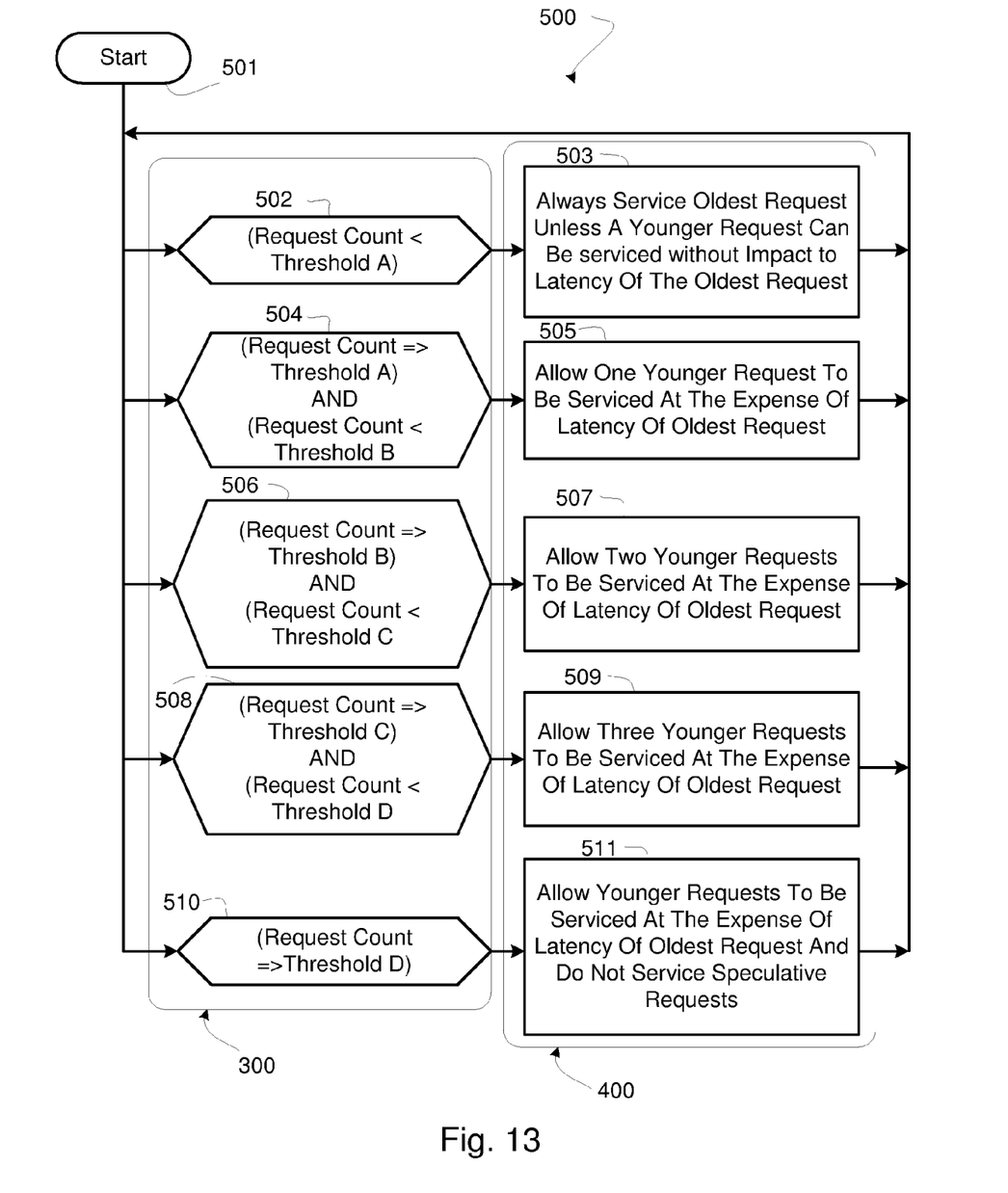
FIG. 13 illustrates steps used to provide granular control of ordering of servicing requests.

Compares 133 in FIG. 6b each output a "1" if the value in request count 132 is equal to or greater than the threshold 130 being compared. Compares 133 in FIG. 6b therefore produce a "thermometer code"; that is, as the value in request count 132 increases mode 136 goes from '0000' to '0001' to '0011' to '0111' and finally to '1111'. Other embodiments of compares 133 are contemplated, for example, such as is depicted in FIG. 13 and discussed with reference to FIG. 13.

As the read queue 121 begins to fill, and eight pending requests are in read queue 121, the value in request count 132 equals the value in threshold A 130a, and compare 133a activates memory access mode bit 136a. (Memory access mode 136='0001', where memory access mode bit 136a is the least significant bit). Responsive to memory access mode 136='0001', control logic 122 allows one younger request to be serviced at the expense of servicing the oldest request, if the younger request being taken out of order results in elimination of a gap on memory bus 107.

If read queue 121 continues to fill up and has ten pending requests, the value (ten) of request count 132 equals the value in threshold B, and compare 133b activates memory access mode bit 136b, making memory access mode 136 '0011'. Control logic 122, responsive to memory access mode 136='0011' will allow one or two younger requests to be serviced before the oldest request, if doing so eliminates one or more gaps on memory bus 107.

If read queue 121 fills further, and has twelve pending requests, the value (twelve) of request count 132 equals threshold C 130c and compare 133c activates memory access mode bit 136c, causing memory access mode 136 to be '0111'. Responsive to memory access mode 136='0111', control logic 122 allows up to three younger requests to be serviced before the oldest request, if doing so eliminates one or more gaps on memory bus 107.

If read queue 121 fills still further and reaches fourteen pending requests, the value (fourteen) of request count 132 equals threshold D 130c and compare 133d activates memory access mode bit 136d, causing memory access mode 136 to be '1111'. Responsive to memory access mode 136='1111', control logic 122 serves requests in read queue 121 in an order that minimizes gaps on memory bus 107, similar to as described with reference to when upper threshold 130b in FIG. 6a was exceeded. Some processors 102 make speculative read requests. A speculative read request is made when processor 102 predicts that the data to be read responsive to the request will be needed. Not all speculative reads are actually needed by processor 102. In an embodiment, when memory access mode 136='1111', speculative requests are not serviced by control logic 122 if a non-speculative request can be serviced.

Figure 7:
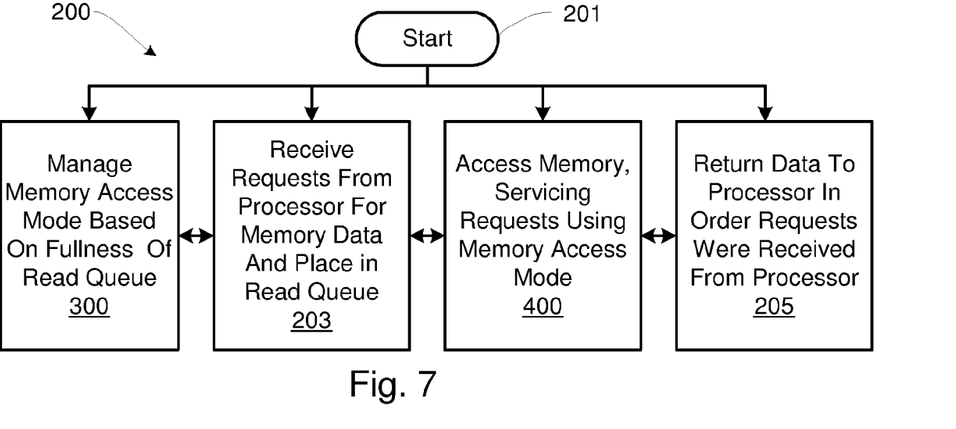
FIG. 7 is a flow diagram illustrating, at a high level, memory request ordering functions performed by the memory controller according to an embodiment of the invention.

Embodiments of the invention can also be expressed as methods. FIG. 7 gives a very high level flow diagram of method 200. Method 200 begins at step 201. Steps 300, 203, 400, and 205 can be thought of as parallel processes with interdependencies.

Method 300 provides management of a memory access mode, such as memory access mode 136 shown in FIG. 6a as a single bit, or memory access mode 136 shown in FIG. 6b as a plurality of bits that provide granularity as described above with reference to FIG. 6b. Simply put, method 300 compares a value of a request count (such as request count 132 (FIG. 6a or FIG. 6b) against one or more threshold values (such as lower threshold 130a and upper threshold 130b in FIG. 6a, or thresholds 130a, 130b, 130c, 130d of FIG. 6b) and determines a memory access mode that can be used to determine an order that requests for data are serviced.

Step 203 receives requests from a processor for data residing in a plurality of memory chips controlled by a memory controller. The memory controller places the requests in a read queue. In embodiments, the memory controller determines from an address value portion of the request what memory chip and what bank in the memory chip must be read responsive to the request. In an embodiment, the memory controller tracks an order that requests are received by position in the read queue. In an alternative embodiment, the memory controller assigns a value to each request suitable for determining order that requests are received by the memory controller.

Step 400 accesses memory, servicing requests from the read queue, using the memory access mode determined by step 300 to determine an order in which requests from the read queue are serviced.

Step 205 buffers data read from memory and, in a computer system needing data to be returned in the order requested, returns the data to the processor in the order that requests for the data were received from the processor by the memory controller.

Figure 8:
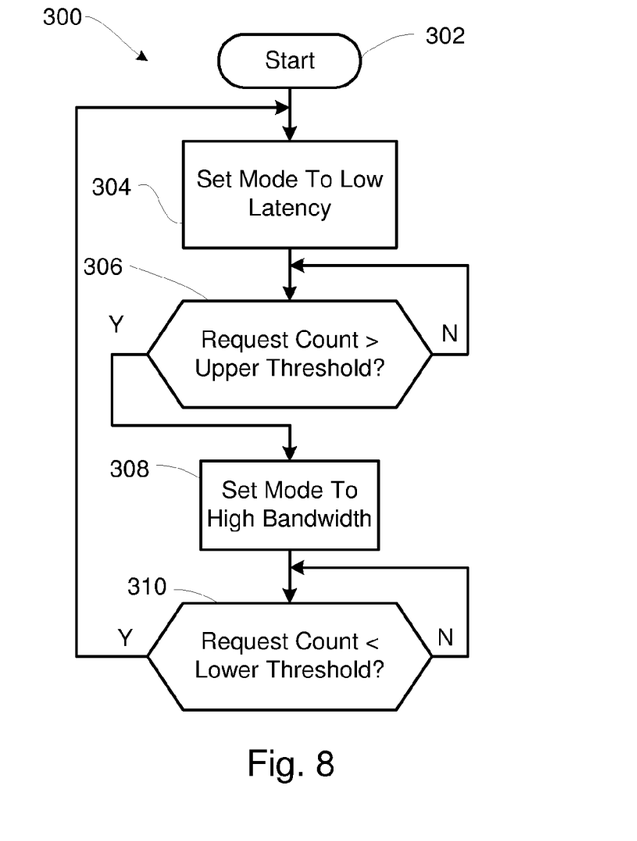
FIG. 8 is a flow chart illustrating management of a memory access mode.

A more detailed method embodiment of step 300 (FIG. 7) is shown in FIG. 8. Method 300 of FIG. 8 is a method embodiment similar to that shown as control logic 122 in FIG. 6a and produces a memory access mode that is either a low latency mode or a high bandwidth mode. Method 300 begins at step 302. In step 304, memory access mode is set to low latency. A low latency mode will be recognized in step 400 (FIG. 7) as meaning that requests in the read queue are to be serviced oldest request first, unless a younger request can be serviced without impacting latency of the oldest request. In step 306, a count of pending requests in the read queue is compared against an upper threshold. If the count exceeds the upper threshold (equaling or exceeding is contemplated), control is passed to step 308; if not, control returns to step 306. In step 308, the memory access mode is set to a high bandwidth mode. The high bandwidth mode is intended to eliminate gaps, to the degree possible, by servicing requests in an order that makes requests to different banks of a single memory chip before servicing a request to a different memory chip. Step 310 compares the request count of pending requests to a lower threshold, the lower threshold being less than the upper threshold. If the request count is not less than the lower threshold, control passes back to step 310. If the request count is less than the lower threshold, control passes back to step 304.

Method 300 continues as long as a computer system comprising the processor, the memory controller, and the memory, is operating.

Figure 9:
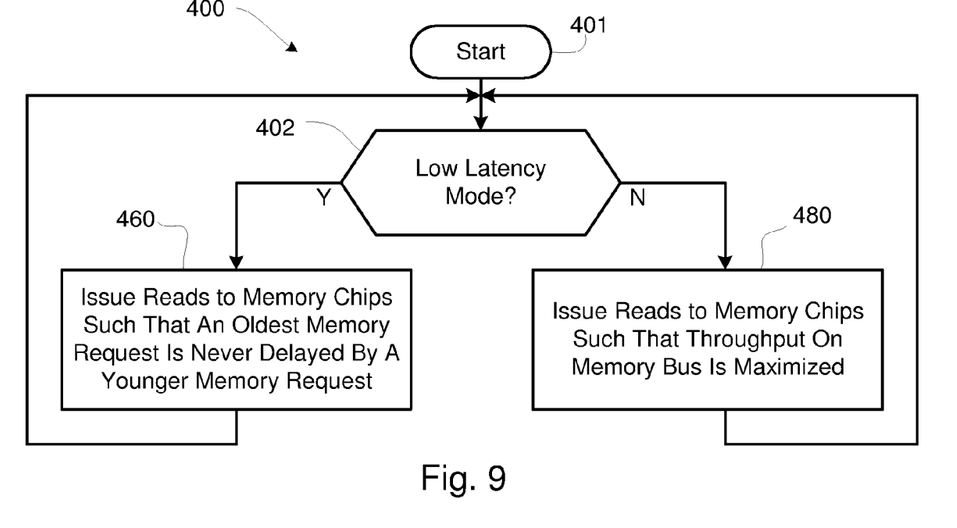
FIG. 9 is a flow chart illustrating how the memory access mode of FIG. 8 is used by the memory controller to switch between different schemes of accessing memory.

FIG. 9 shows a high level flow chart of an embodiment of method 400 that corresponds with control logic 122 of FIG. 6a. Method 400 begins at step 401. In step 402, the present state of a memory access mode (e.g., memory access mode 136 in FIG. 6a and further described with reference to method 300 above) is queried. If the memory access mode is low latency, control passes to step 460, and control logic 122 will issue reads to memory chips such that the oldest request in the read queue will always be serviced unless a younger request can be serviced without impacting latency of the oldest request. If step 402 determines that the memory access mode is not low latency, control passes to step 480, and control logic 122 (FIG. 6a) will issue reads to the memory chips such that throughput on the memory bus is maximized. As explained earlier, this is done by consecutively servicing requests from the read queue that are to different banks of the same memory chip, when possible to do so, in order to avoid having to have gaps in data transmission from the memory chips to the memory controller.

Figure 10:
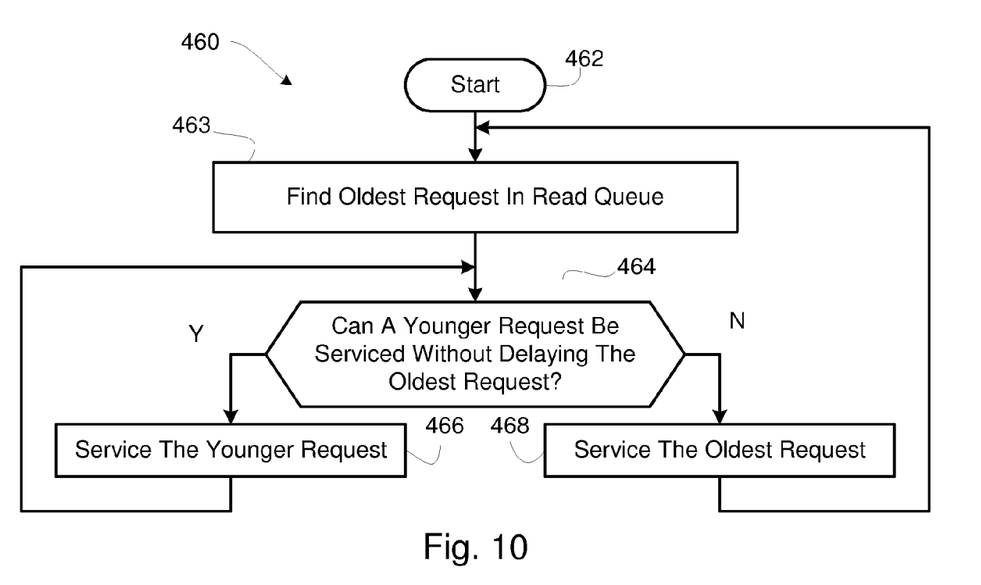
FIG. 10 illustrates in more detail a low latency mode of accessing memory.

FIG. 10 shows method 460 which provides more detail for step 460 of method 400 (FIG. 9). Method 460 services requests in a low latency mode, where the oldest request in the read queue is serviced first, unless a younger request can be serviced without impacting latency of the oldest request.

Method 460 begins at step 462. In step 463, an oldest request in the read queue is determined. Determination of the oldest request can be done by picking the last element in the read queue in embodiments where physical position of a request in the read queue is the age of the request, and the oldest request is the last element in the read queue. Alternatively, pointers can be used to keep track of age of requests in the read queue. Still another alternative is to include a field in the request that can be filled by the memory controller with a value indicative of order of receipt of requests.

In step 464, a check is made to see if a younger request can be serviced without impacting latency of the oldest request. For example, the oldest request in the read queue may be to a particular bank in a particular memory chip that is being accessed by a previous request. A significant amount of time is required to open the particular bank, read data from the particular bank, and to close the particular bank. A younger request to a different bank in the same memory chip or perhaps to a different memory chip might be started and driven data back to the memory controller before the particular bank in the particular memory chip can be accessed for the oldest request. If a younger request can be serviced without impacting latency on the oldest request, the younger request is serviced in step 466. Step 466 passes control back to step 464. Otherwise, the oldest request is serviced in step 468. Step 468 passes control back to step 463.

Figure 11:
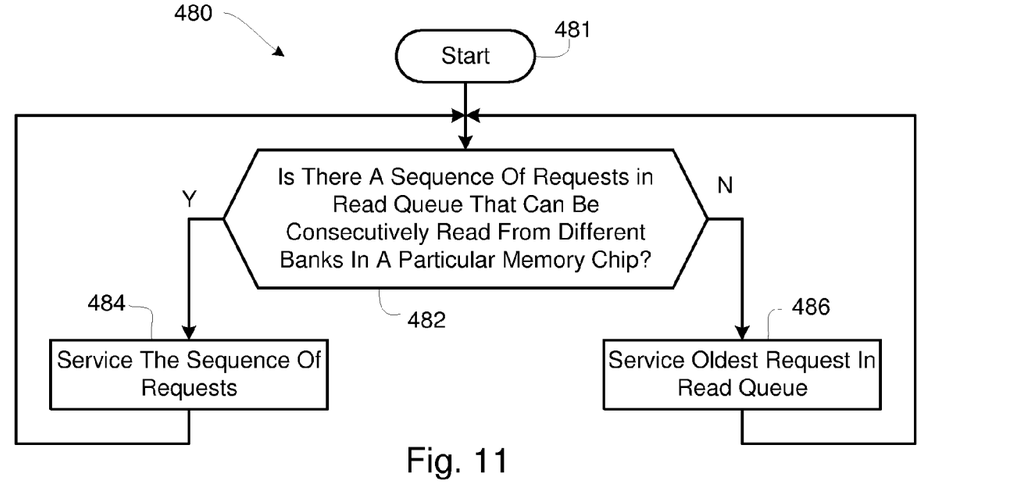
FIG. 11 illustrates in more detail a high bandwidth mode of accessing memory.

FIG. 11 shows an embodiment of additional steps in step 480 of FIG. 9. Step 480 seeks to maximize throughput on a memory bus, such as memory bus 107 of FIG. 5.

Step 481 begins the additional steps of step 480. In step 482, requests in the read queue are examined to see if there is a sequence of requests that can be consecutively read from different banks in a particular memory chip. The memory control knows which memory chip and which bank in a memory chip each request needs to access. Consecutively accessing different banks in the same memory chip eliminates a need for placing gaps ("dead cycles") on the memory bus and therefore maximizes throughput on the memory bus. If such a sequence of requests exists, control passes to step 484 and the sequence of requests is serviced. Step 484 returns control to step 482. If such a sequence of requests does not exist, the oldest request in the read queue is serviced.

Figure 12:
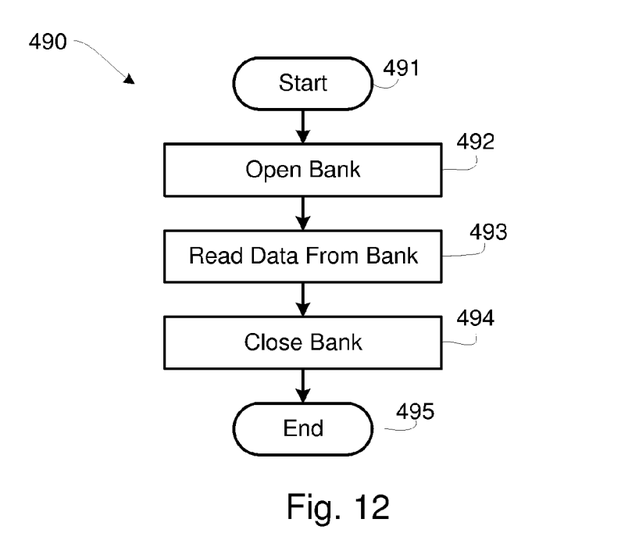
FIG. 12 illustrates steps to service a request by accessing a memory.

FIG. 12 illustrates a method embodiment of servicing a request. Servicing requests has been discussed various times earlier and means reading data from a memory chip. Method 490 begins at step 491. In step 492, a particular bank in a particular memory chip is opened and an address is received by the memory chip for a particular location in the bank. In step 493, data is read from the particular bank. In a typical DRAM (dynamic random access memory) chip, reading means detecting if a selected bit line has been discharged enough to indicate that a "0" (low voltage) had been stored in a capacitor coupled to the bit line. If so, a "0" is latched up and subsequently driven onto the memory bus. If not, a "1" is latched up and subsequently driven onto the memory bus. In step 494, the particular bank is closed (data read is re-written and bit lines are recharged) in order that the bank can later be quickly re-accessed without having to close the bank and recharge the bit lines responsive to a new read at a different word line. It is understood that some computer systems attempt to keep pages open as much as possible. This is done because, during reads, a word line activates many bit lines, not all of which are needed for a particular request. If it is likely that additional requests are made for the bits latched up in a read, but not selected for driving to the memory bus such a protocol is advantageous. For example, suppose that activation of a word line causes 128 bit lines to be read, and eight of the bit lines are used by a particular request. Further suppose that a particular program is linearly accessing data. That is, "striding" eight bits at a time. In such cases, keeping a bank open is advantageous. However, if memory accesses are relatively random, performance will suffer because of frequent need to close a bank in the memory chip before activating a different word line in that bank.

FIG. 13 shows method 500 which incorporates embodiments of steps 300 and 400 (FIG. 7) in a manner corresponding to that performed by the more granular control logic 122 shown in FIG. 6b. In method 500, increasingly aggressive attempts are made to increase throughput on the memory bus as the read queue becomes fuller.

Method 500 begins at step 501. Steps 502, 504, 506, 508, and 510 are shown in a "case statement" format; that is, each of these steps compare a "request count" (see discussion earlier with reference to request count 132 in FIG. 6b) that indicates how full the read queue is at a particular time. Each of these steps compares the value of the request count against one or more thresholds, and the step in which the comparison is "true" activates a signal that causes a step in method 400 to be performed. It will be noted that the "compares" shown in FIG. 13 differ from the compares 133 in FIG. 6b, which produce a "thermometer code" memory access mode 136. The compares of FIG. 13 compare the request count against one or more thresholds as shown.

Step 502 compares the value of the request count against a "Threshold A" (see "Threshold A 130a" in FIG. 6b. Threshold A is intended to be a relatively low threshold, for example, a value of eight for a read queue capable of holding sixteen requests. If step 502 determines that the value of the request count is less than the value of threshold A, step 503 is activated. Step 503 causes requests in the read queue to be serviced oldest first, unless a younger request can be serviced without impacting latency of the oldest request.

Step 504 compares the value of the request count versus "Threshold A" and "Threshold B". If the request count is greater than or equal to "threshold A" and less than "Threshold B", step 505 is activated. In step 505, the memory controller will allow one younger request to be serviced at the expense of latency of the oldest request, if servicing the younger request before the oldest request eliminates a gap ("dead cycle") on the memory bus.

Step 506 compares the value of the request count versus "Threshold B" and "Threshold C". If the request count is greater than or equal to "Threshold B" and less than "Threshold C", step 507 is activated. In step 507, the memory controller will allow one or two younger requests to be serviced at the expense of latency of the oldest request, if servicing the younger request(s) before the oldest request eliminates one or more gaps ("dead cycles") on the memory bus.

Step 508 compares the value of the request count versus "Threshold C" and "Threshold D". If the request count is greater than or equal to "Threshold C" and less than "Threshold D", step 509 is activated. In step 509, the memory controller will allow one, two, or three younger requests to be serviced at the expense of latency of the oldest request, if servicing the younger request(s) before the oldest request eliminates one or more gaps ("dead cycles") on the memory bus.

Step 510 compares the value of the request count versus "Threshold D". If the request count is greater than or equal to "Threshold D", step 511 is activated. In step 511, the memory controller will allow younger requests to be serviced at the expense of latency of the oldest request, if servicing the younger request(s) before the oldest request eliminates one or more gaps ("dead cycles") on the memory bus. In addition, if the processor is configured to make speculative requests, step 511 does not service speculative requests if a non-speculative request can be serviced.

What is claimed is:

1. A computer system comprising
a processor that issues requests for data;
a first memory chip and a second memory chip coupled to a memory bus, each memory chip having a plurality of banks, wherein a dead cycle is required on the memory bus between a first cycle driven by the first memory chip and a second cycle driven by the second memory chip;
a memory controller coupled to the memory bus, the memory controller further comprising a read queue configured to store requests issued by the processor, the memory controller configured to service the requests for data by opening a particular bank, reading the particular bank, and closing the bank, the memory controller configured to control dead cycles on the memory bus as a function of a number of pending requests in the read queue, the memory controller configured to provide more than two memory access modes;
the memory controller further comprising:
a request count that contains a current value of the number of pending requests in the read queue;
a first threshold that contains a first threshold value;
a second threshold that contains a second threshold value, the second threshold value greater than the first threshold value;
a third threshold that contains a third threshold value, the third threshold value greater than the second threshold value;
the memory controller configured to use a first memory access mode if the number of a number of pending requests in the read queue is less than the first threshold value;
the memory controller configured to use a second memory access mode if the number of a number of pending requests in the read queue is greater than or equal to the first threshold value and less than the second threshold value; and
the memory controller configured to use a third memory access mode if the number of a number of pending requests in the read queue is equal to or greater than the third threshold value;
the memory controller in the first memory access mode configured to service an oldest request in the read queue unless a younger request can be serviced without increasing a latency of the oldest request;
the memory controller in the second memory access mode configured to degrade latency of the oldest request by a first amount by servicing one or more younger requests before servicing the oldest request, whenever servicing the one or more younger requests eliminate one or more dead cycles on a memory bus; and
the memory controller in the third memory access mode configured to degrade latency of the oldest request by a second amount, the second amount greater than the first amount, by servicing one or more younger requests before servicing the oldest request, whenever servicing the one or more younger requests eliminate one or more dead cycles on a memory bus.

2. The computer system of claim 1, the memory controller in the third memory access mode configured to not service a speculative request if servicing a speculative request increases latency of a non-speculative request.

3. The computer system of claim 1, wherein the first, second, and third thresholds are configured to be programmable.

4. The computer system of claim 1, wherein the first, second, and third thresholds have hard-wired values.

5. The computer system of claim 1, the memory controller configured to return data to the processor in the order that the processor issued requests for the data.

6. A method of servicing read requests in a computer system comprising the steps of:
- receiving read requests issued by a processor into a read queue; and
- determining a memory access mode, from a set of memory access modes having more than two memory access modes, as a function of a number of pending requests in the read queue;
- determining the memory access mode further comprising the steps of:
- if the number of pending requests is less than a first threshold, setting the memory access mode to a first memory access mode;
- if the number of pending requests is equal to or greater than the first threshold and less than a second threshold, setting the memory access mode to a second memory access mode;
- if the number of pending requests is equal to or greater than the second threshold, setting the memory access mode to a third memory access mode;
- wherein when the memory access mode is in the first memory access mode, servicing requests in the read queue by issuing reads to memory chips such that an oldest request is never delayed by a younger request;
- wherein when the memory access mode is in the second memory access mode, allowing the oldest request to be delayed by a first amount by servicing one or more younger requests before servicing the oldest request whenever servicing the one or more younger requests eliminates one or more dead cycles on a memory bus; and
- wherein when the memory access mode is in the third memory access mode, allowing the oldest request to be delayed by a second amount, the second amount greater than the first amount, by servicing one or more younger requests before servicing the oldest request whenever servicing the one or more younger requests eliminates one or more dead cycles on the memory bus.

7. The method of claim 6, further comprising the step of, when the memory access mode is in the third memory access mode, not servicing a speculative request when servicing the speculative request would delay servicing a non-speculative request.

* * * * *